(12) United States Patent
Gonin et al.

(10) Patent No.: US 8,562,042 B2
(45) Date of Patent: Oct. 22, 2013

(54) BUMPER ASSEMBLY FOR MOTOR VEHICLE, END PORTION OF MOTOR VEHICLE COMPRISING SUCH AN ASSEMBLY AND MOTOR VEHICLE

(75) Inventors: Vincent Gonin, Saint Cyr sur Loire (FR); Laurent Droz Bartholet, Audincourt (FR); Julien Dufee, Novillard (FR)

(73) Assignee: Faurecia Bloc Avant, Nanterre (FR)

( * ) Notice: Subject to any disclaimer, the term of this patent is extended or adjusted under 35 U.S.C. 154(b) by 189 days.

(21) Appl. No.: 12/977,539

(22) Filed: Dec. 23, 2010

(65) Prior Publication Data

US 2011/0156414 A1 Jun. 30, 2011

(30) Foreign Application Priority Data

Dec. 24, 2009 (FR) .................................. 09 59606

(51) Int. Cl.
*B60R 19/12* (2006.01)
(52) U.S. Cl.
USPC .......................................................... 293/132
(58) Field of Classification Search
USPC ........... 296/187.03, 187.09, 203.02; 293/141, 293/142, 143, 144, 133, 132, 155, 120
See application file for complete search history.

(56) References Cited

U.S. PATENT DOCUMENTS

| | | | | |
|---|---|---|---|---|
| 3,819,224 A | * | 6/1974 | Casey et al. | ............... 296/187.09 |
| 4,951,985 A | * | 8/1990 | Pong et al. | ..................... 293/102 |
| 7,681,700 B2 | | 3/2010 | Ginja et al. | |
| 8,118,346 B2 | * | 2/2012 | Ginja et al. | ............... 296/187.03 |
| 2003/0075951 A1 | * | 4/2003 | Hanakawa et al. | ........... 296/188 |
| 2007/0144851 A1 | * | 6/2007 | Ginja et al. | ..................... 188/377 |
| 2009/0315343 A1 | | 12/2009 | Gonin | |
| 2010/0102577 A1 | * | 4/2010 | Ginja et al. | ..................... 293/102 |
| 2010/0244472 A1 | | 9/2010 | Gonin et al. | |
| 2011/0121586 A1 | * | 5/2011 | Gonin | .......................... 293/132 |
| 2011/0221213 A1 | * | 9/2011 | Riviere et al. | .................. 293/132 |
| 2011/0254295 A1 | * | 10/2011 | Cave et al. | ..................... 293/132 |

FOREIGN PATENT DOCUMENTS

| | | |
|---|---|---|
| DE | 20 2010 002511 U1 | 5/2010 |
| EP | 2 135 775 A1 | 12/2009 |
| FR | 2 882 327 A1 | 8/2006 |
| FR | 2 911 559 A1 | 7/2008 |
| FR | 2 919 568 A1 | 2/2009 |
| WO | 2008074300 A2 | 6/2008 |

OTHER PUBLICATIONS

French Search Report, Dated Jul. 16, 2010, in FR 0959606.

* cited by examiner

*Primary Examiner* — Glenn Dayoan
*Assistant Examiner* — Pinel Romain
(74) *Attorney, Agent, or Firm* — Young & Thompson (57) ABSTRACT

This bumper assembly is adapted for a motor vehicle having a structure including a pair of upper side members (6) and a pair of lower side members (8). It includes an energy absorbing panel (12) having at least two columns (16) each provided to bear on the ends of an upper side member (6) and a lower side member (8) and a beam (18) extending transversely between the columns (16). According to one embodiment, the bumper assembly includes a plate (36) doubling the beam (18) such that the beam (18) is compressed between a frontal face (36a) of the plate (36) in case of impact. The device is applicable to front or rear bumpers.

15 Claims, 6 Drawing Sheets

BUMPER ASSEMBLY FOR MOTOR VEHICLE, END PORTION OF MOTOR VEHICLE COMPRISING SUCH AN ASSEMBLY AND MOTOR VEHICLE

The present invention concerns a bumper assembly for a motor vehicle having a structure comprising a pair of upper side members and a pair of lower side members, the bumper assembly being of the type comprising an energy absorbing panel having at least two columns each provided to bear on the ends of an upper side member and a lower side member and a beam extending transversely between the columns.

Modern vehicles are designed to suitably respond to different possible types of frontal impacts, such as low-speed impacts or parking impacts with a speed between 2.5 and 4 km/h (ECE 42), medium-speed or "reparability" impacts, with a speed of about 16 km/h (DANNER impacts), and high-speed impacts, with a speed between 56 and 65 km/h.

Modern motor vehicles are also designed to protect pedestrians in the event of collisions with pedestrians, and in particular to protects pedestrians' legs and hips.

One aim of the invention is to propose a bumper assembly making it possible to suitably absorb the energy from an impact while limiting the intrusion of an object colliding with the vehicle towards the inside of the vehicle's structure.

To that end, the invention proposes a bumper assembly of the aforementioned type, characterized in that it comprises a plate doubling the beam such that the beam is compressed between a frontal face of the plate in case of impact.

According to other embodiments, the bumper assembly can comprise one or several of the following features:
  it comprises two stages, each stage doubling a column such that the column is compressed against a front face of the corresponding stage in case of impact;
  the stages are made of metal;
  the plate is made of metal;
  the plate is formed in a single piece with the stages;
  the panel comprises an upper beam and a lower beam extending transversely between the columns;
  the plate lines the upper beam;
  the panel is a single piece; and
  the panel is made from plastic.

The invention also concerns an end portion of a motor vehicle comprising a pair of upper side members and a pair of lower side members and a bumper assembly as defined above arranged at the ends of the upper and lower beams, the plate extending transversely between the side beams while being connected thereto.

According to other embodiments, the end portion can comprise one or several of the following features:
  the upper side members are the main side members of the structure of the motor vehicle;
  the lower side members are auxiliary side members of the structure of the motor vehicle extending over a smaller height than that of the main side members;
  the lower side members are extensions of a cradle fastened under the structure of the motor vehicle; and
  the cradle is an engine cradle.

The invention also concerns a motor vehicle comprising an end portion as defined above.

The invention and its advantages will be better understood upon reading the following description, provided solely as an example and done in reference to the appended drawings, in which.

Hereinafter, the orientation terms are used in reference to the normal orientation of motor vehicles, illustrated in FIGS. 1 and 2 by an arrow S oriented horizontally towards the front in a longitudinal direction of the motor vehicle.

Figure 1:
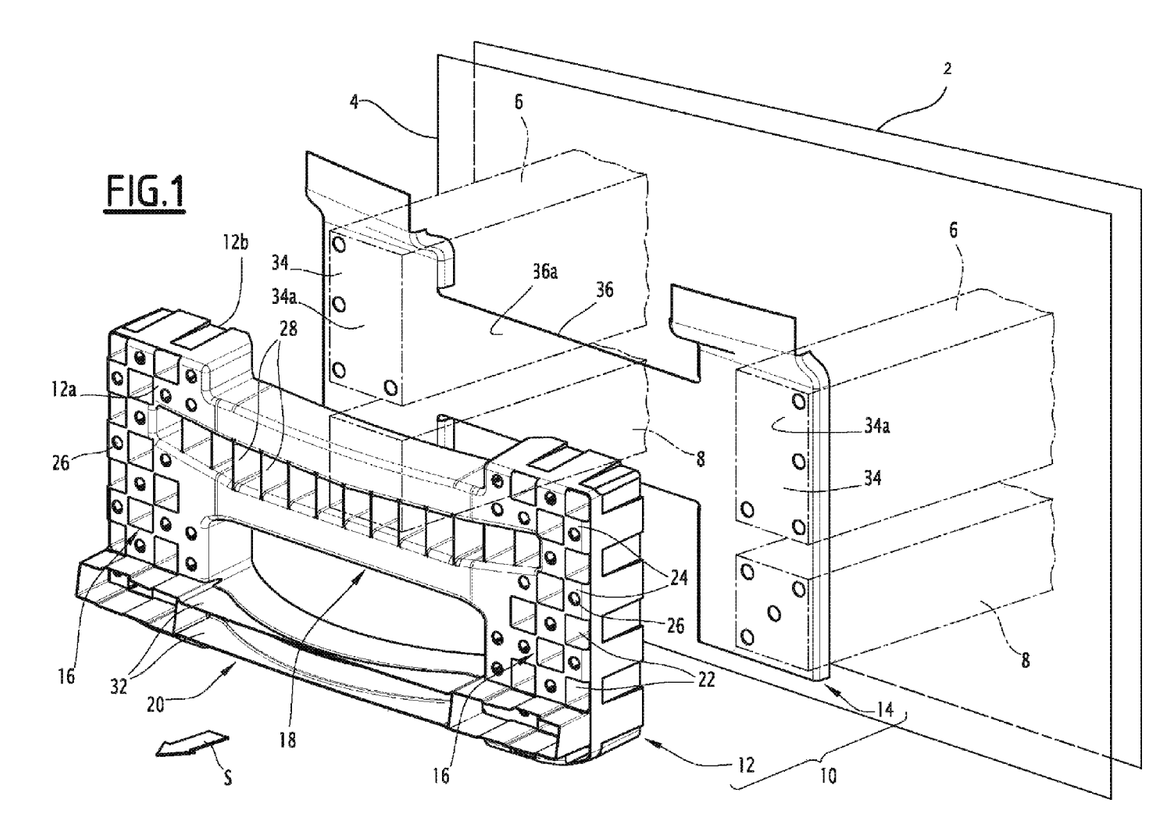
FIGS. 1 and 2 are diagrammatic perspective views, exploded and assembled, respectively, of a front portion of the motor vehicle according to the invention.
Figure 2:
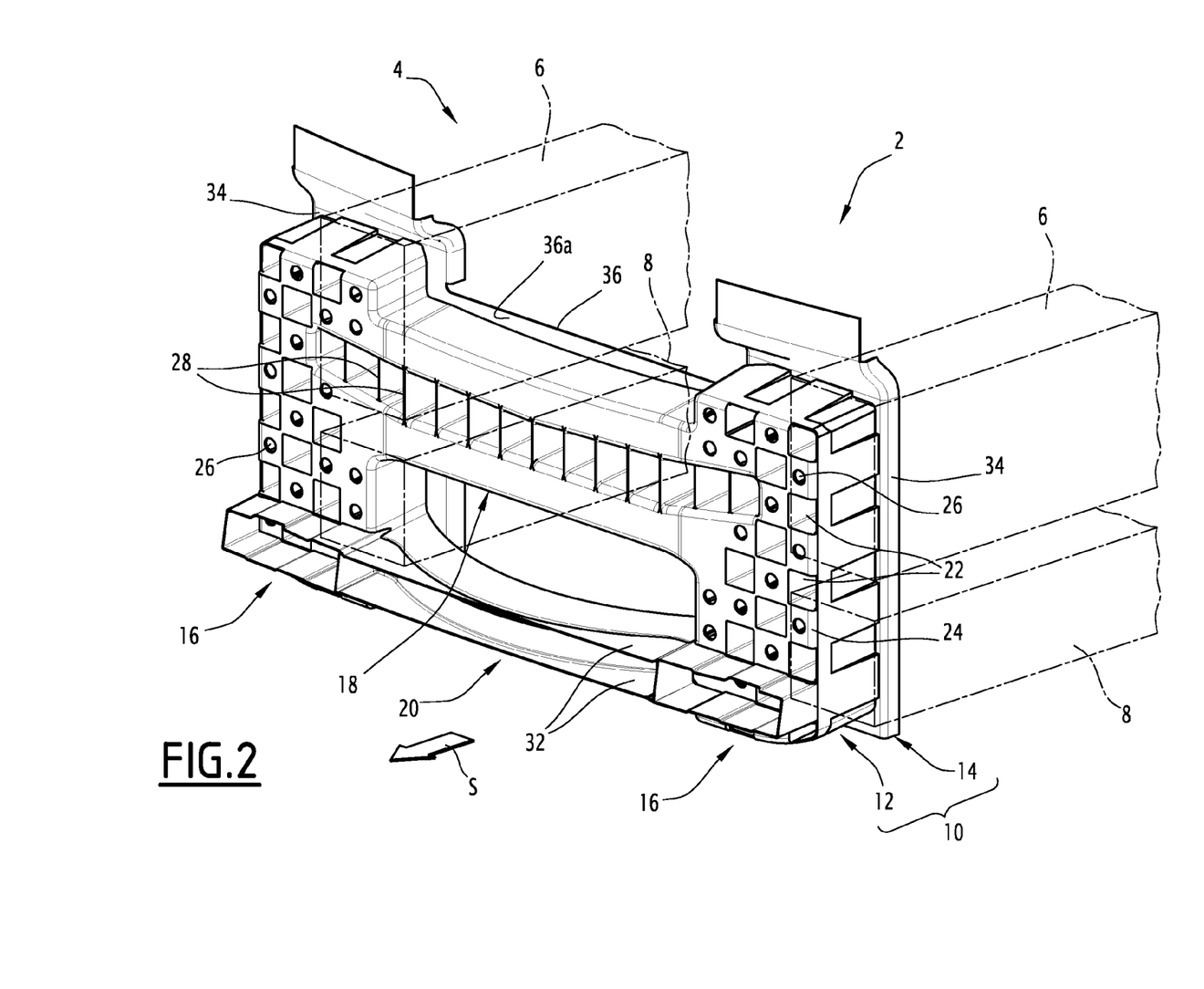

As shown in FIGS. 1 and 2, a motor vehicle 2 (shown schematically in FIG. 1) comprises a front portion or end portion 4 (also shown schematically in FIG. 1) including a pair of upper side members 6, a pair of lower side members 8, and a front bumper assembly 10.

The upper side members 6 extend substantially in the longitudinal direction of the motor vehicle and are transversely spaced apart from each other.

The lower side members 8 extend substantially in the longitudinal direction of the motor vehicle and are spaced transversely apart from each other. The transverse separation between the lower side members 8 is substantially equal to the transverse separation between the upper side members 6. The lower side members 8 are situated at a lower height than that of the upper side members 6. Each lower side members 8 extends under a side member having substantially the same vertical and longitudinal plane.

The ends of the upper side members 6 and the lower side members 8 are substantially in the same vertical and transverse plane.

The upper side members 6 are typically tared to take a maximum axial force without buckling between 80 kN and 100 kN. The lower side members 8 are typically tared to take a maximum axial force without buckling between 25 kN and 45 kN. On certain vehicles with the gauge far from the average, the proposed taring ranges can differ slightly without going beyond the scope of the invention.

The upper side members 6 are provided to receive between them and at least partially bear a front face. A front face conventionally assumes the form of a frame supporting the functional members of the motor vehicle such as a radiator of a cooling system of the drive train and/or such as one or several radiators or an electric fan assembly of an air conditioning system. The front face is fastened to the upper side member 6 preferably withdrawn from the ends of the upper beams 6.

The bumper assembly 10 comprises an energy absorbing panel 12 and a reinforcement 14 at least partially doubling or lining the panel 12.

The panel 12 is provided to dissipate the energy by deforming, and in particular by crushing or compressing in the longitudinal direction, under the effect of an impact.

The panel 12 assumes the form of a block of material having a certain thickness in the longitudinal direction, between a front face 12a and a rear face 12b of the panel 12. The panel 12 has, in said thickness, a shell structure for significant energy dissipation.

The panel 12 comprises two columns 16 and an upper beam 18 extending transversely between the columns 16. Each column 16 is provided to extend substantially vertically, the upper beam 18 extending substantially horizontally between the columns 16. Each column 16 is provide to bear rigidly simultaneously on the ends of an adjacent upper side member 6 and lower side member 8 situated on the same side (FIG. 2). The upper beam 18 and the columns 16 jointly define an "H"

or upside-down "U" shape. The upper beam 18 is situated substantially at the height of the upper side members 6.

Optionally, the panel 12 comprises a lower beam 20 extending transversely between the lower ends of the columns 16. The lower beam 20 is vertically spaced from the upper beam 18. The panel 12 provided with the lower beam 20 has a generally rectangular square shape. The lower beam 18 is situated substantially at the height of the lower side members 8.

The columns 16 serve to absorb energy by compression in case of impact.

To that end, each column 16 has a certain thickness and has a shell structure.

In the illustrated example, each column 16 has a cellular structure comprising cells extending longitudinally between the front face 12a and a rear face 12b of the panel 12. Each column 16 comprises inverted cells compressing first cells 22 closed on the side of the rear face 12b and open on the side of the front face 12a and second cells 24 open on the side of the rear face and closed on the side of the front face. The first cells 22 and the second cells 24 are arranged in staggered rows (or checkered).

In the illustrated example, the walls closing the cells 22, 24 are provided with weakening orifices 26 to obtain satisfactory energy dissipation. Alternatively, the walls closing the cells 22, 24 are solid.

The upper beam 18 also serves to absorb energy by compression in case of impact.

The upper beam 18 has a certain thickness and has a shell structure.

In the illustrated example the upper beam 18 has a substantially W-shaped straight section defining two channels open towards the rear and one channel open towards the front, and reinforcing ribs 28 (FIGS. 1 and 2) extending inside the channels.

The lower beam 20 serves to protect the pedestrian's legs in case of collision. The lower beam 20 is provided to impact a pedestrian's leg at the tibia, under the knee.

Figure 3:
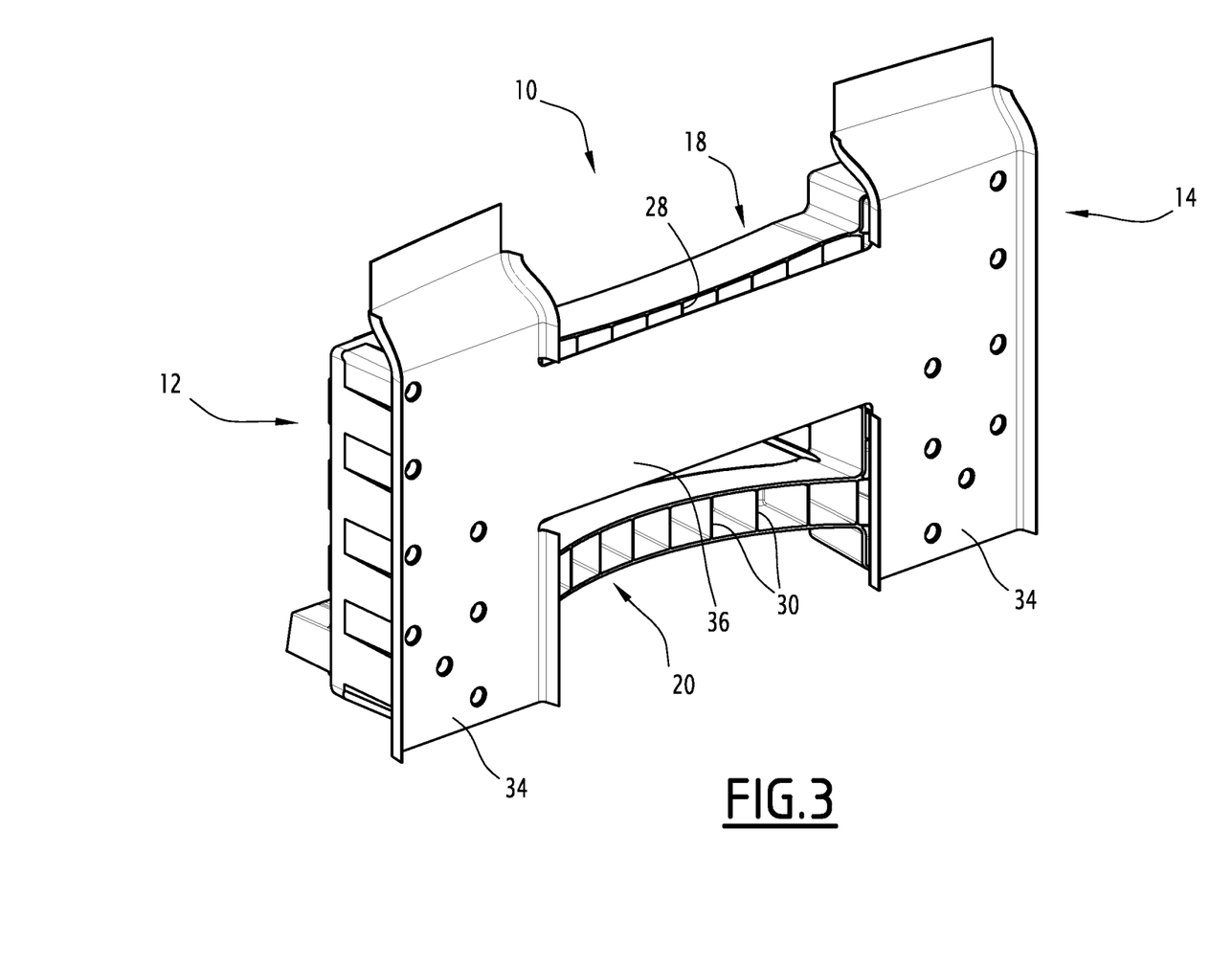
FIG. 3 is a perspective view of a bumper assembly of the front portion of the FIGS. 1 and 2, according to another viewing angle.

The lower beam 20 is provided to work essentially in flexion when it undergoes an impact. In the illustrated example, the lower beam 20 is arched towards the front. It has a U-shaped transverse section open towards the rear and internal reinforcing ribs 30 (FIG. 3).

The panel 12 also comprises ribs for protecting pedestrians 32 extending protruding horizontally forward from the lower beam 20 and the columns 16, substantially at the height of the lower beam 20.

These protective ribs 32 form a first contact zone with a pedestrian's leg. They are provided to buckle under a weak stress.

The reinforcement 14 assumes the form of a thin sheet at least partially lining or doubling the panel 12 and provided to provide rigid bearing to the panel 12 for its crushing by compression against the reinforcement 14 in case of shock.

The reinforcement 14 comprises stages 34 transversely spaced and a plate 36 extending transversely between the stages 34. The plate 36 is provided to line the upper beam 18. Each stage 34 is provided to line a respective column 16. The stages 34 and the plate 36 each give the reinforcement 14 an "H" or upside-down "U" shape.

The reinforcement 14 is provided to be arranged against the rear face 12b of the panel 12, sandwiched between the panel 12 and the ends of the side members 6, 8.

Each stage 34 is fastened to the ends of an adjacent upper side member 6 and lower side member 8, sandwiched between said ends, and a column 16. Each stage 34 forms a connection between the adjacent upper side member 6 and lower side members 8. Each stage 34 has a frontal bearing face 34a for a column 16.

The plate 36 extends transversely between the side members 6, 8, substantially at the height of the upper side members 6. The plate 36 connects the upper side members 6 to each other. The plate 36 has a frontal bearing face 36a for the upper beam 18.

According to the invention, the plate 36 assumes the form of a thin sheet having a low stiffness in flexure in the longitudinal direction. The plate 36 is relatively flexible in the longitudinal direction in the free state and connected at its ends to the upper side members 6.

In case of collision impacting the plate 36 in the longitudinal direction, the plate 36 offers little resistance in flexion and works essentially in traction between the two upper side members 6 that hold the plate 36 at its ends.

The upper beam 18 operates in a manner that is complementary with the plate 36. The plate 36, although relatively flexibly in the longitudinal direction, is retained due to its connections to the upper side members 6 and offers a transversely extended bearing surface for the upper beam 18 allowing the upper beam 18 to work uniformly in compression against the plate 36 in case of collision. The energy is dissipated over a small stroke, for example corresponding to the thickness of the upper beam 18 and for example between 100 and 180 mm.

This operation with separate functions—compression of the upper beam 18 and traction of the plate 36—allows efficient and controlled work by the assembly made up of the upper beam 18 and the plate 36.

The plate 36 can be provided in a traction-resistant material, for example a metal sheet, while the upper beam 18 is made in a material allowing significant energy dissipation by compression, for example a plastic material such as polypropylene (PP). The thin plate 36 does not crush in case of impact and keeps its tractive resistance.

The elongation of the plate 36 provided in the form of a metal sheet can be reduced (between 2% and 8%), which makes it possible to limit the intrusion of another vehicle or an object stuck by the bumper assembly 10 towards the inside of the motor vehicle 2 and to have an effective connection between the two upper side members 6.

The stages 34 with a large height or "giant stages" connecting each upper side member 6 to a lower side member 8 make it possible to distribute the stresses taken by the bumper assembly 10 over a significant height in the vehicle.

The stages 34 offer an extended rigid bearing surface to the columns 16, which allows the columns 16 to work uniformly in compression in case of shocks, without flexure in their middle portion situated vertically between the upper side members 6 and the lower side members 8. This asset allows a homogenous design of the columns 16 having uniformly distributed similar cells.

The dimensions of the bearing offered by each stage 34 are advantageously between 100 and 190 mm wide and between 350 and 400 mm high, which corresponds to areas globally between 3.5 and 8 dm$^2$.

Generally, the panel 12 and the reinforcement 14 operate in a complementary manner in case of impact. The thick panel 12 compresses while dissipating the energy, while the thin reinforcement 14 distributes the stresses over the side members 6, 8 and provides bearing for the upper beam 18 without compressing and keeping its tractive mechanical strength.

The bumper assembly 10 is provided to absorb the energy in case of low-speed or medium-speed impacts, so as to preserve the integrity of the side members 6, 8.

The vehicle provided with a bumper assembly according to the invention is less intrusive when it comes into contact with another vehicle, which benefits the intra-vehicle compatibility at low and medium speeds.

The cellular structure of the columns 16 facilitates production and grants a sufficient energy absorption capacity over a small thickness.

The panel 12 is advantageously obtained in a single piece, for example by injection molding of plastic material. It can be stripped in a single direction corresponding to the longitudinal direction of the motor vehicle when the panel 12 is fastened on the side members 6. Thus, the panel can be obtained simply, with a low production cost.

In the illustrated example, the panel 12 comprises a lower beam 20 made in a single piece with the columns 16 and the upper beam 18. Alternatively, the panel 12 does not have a lower beam. It is also possible to provide a lower beam separated from the panel 12 and fastened between the lower ends of the columns 16.

The cellular structure of the columns 16 allows small, or even non-existent, undercuts, which limits the weight and the production cost of the panel 12. The pieces obtained are therefore light and save material.

The cellular structure of the columns 16 also makes it possible to reduce the local thicknesses of walls defining the cells. Thus, this local thickness can be reduced in a range between 2.5 and 4 mm, advantageously between 3 mm and 3.5 mm.

Moreover, and generally, the stripping of the single-piece panel 12 is made easier, since the small undercuts and the absence thereof allows striping by moving two opposite half-molds in opposite directions along an axis corresponding to the longitudinal axis of the motor vehicle. Thus it is not necessary to provide drawers or mobile portions in the mold.

Moreover, the small or non-existent undercuts in the checkered columns 16 make it possible to obtain a uniform stiffness during caving in or crushing, for example during a medium-speed impact. Thus, it is possible to obtain a substantially constant stress compensation as a function of the movement, which increases the dissipated energy and decreases the absorption travel, all while remaining under the taring force of the side members 6, 8 defined above.

It results that the energy of an impact can be dissipated in return for reduced travel and that the solution is very compact. This solution is therefore particularly suited to vehicles with a low cubic inch displacement having a longitudinal shock absorption travel less than 250 mm, and in particular less than 200 mm. The columns 16 have a longitudinal thickness between 220 and 220 mm. This allows efficient energy absorption while limiting the cantilever of the panel 12 between the stages 14 and the front end of the panel 12.

The reinforcement 14 is advantageously made in a single piece and formed from a side of metal sheet cut out and, if necessary, shaped, in particular by stamping and/or bending. Thus, the reinforcement 14 is obtained easily and inexpensively, and has a high resistance.

Alternatively, the reinforcement 14 is formed by fastening metal sides to each other, for example to sides defining the stages 34 and one side defining the plate 36.

Each column 16 is fastened on the corresponding stage 34 by screwing or by adhesion. This second solution is advantageous, inasmuch as it allows good stress distribution. Indeed, the constraints of the design and assembly by screwing (metal insert, hole, rigidifying base plate, space for screw guns) are lifted while the localized strains and the risks of tearing caused by screwing are greatly lessened. Moreover, the chosen geometry made up of inverted closed cells arranged in staggered rows considerably increases the gluing surface at the rear of the posts and plays a role in favorable stress distribution.

As shown in FIGS. 1 to 4, the reinforcement 14 comprises a substantially planar plate 36 coplanar with the stages 34.

Figure 5:
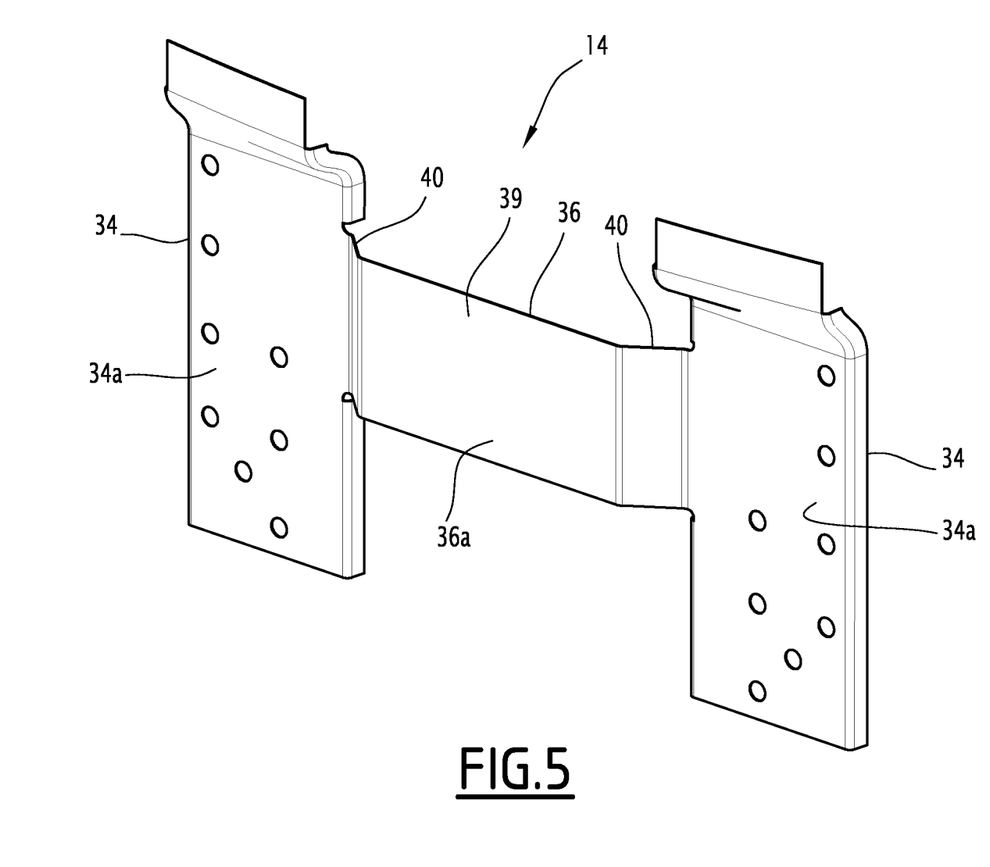
FIGS. 5 and 6 are perspective views of reinforcements according to alternatives of the invention.

In the embodiment of FIG. 5, the plate 36 has a planar central portion 39 offset relative to the stages 34 to follow the rear face 12b of the panel 12 along the upper beam 18 and curved side portions 40 connecting the plate 36 to the stages 34.

The plate 36 of FIG. 5 has a rectilinear straight section over its entire length and keeps a low bending moment in the longitudinal direction.

Figure 4:
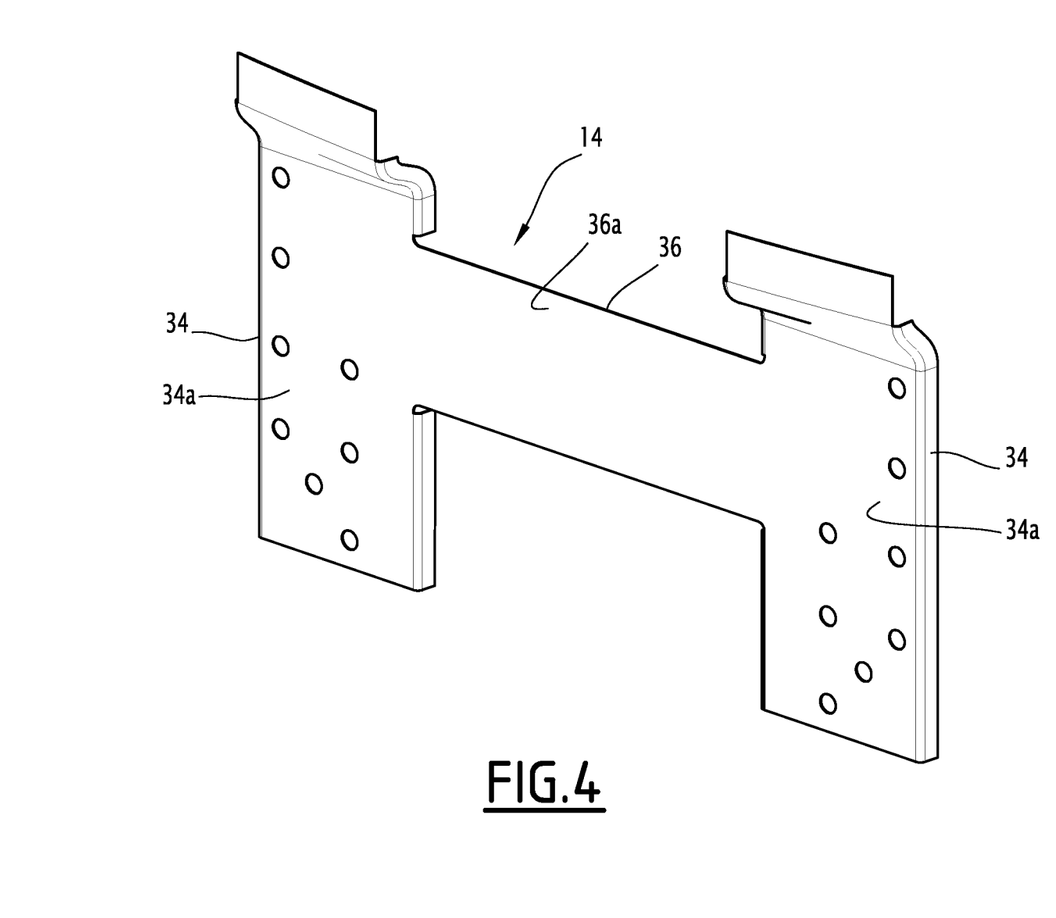
FIG. 4 is a perspective view of a reinforcement of the bumper assembly of FIG. 3.

As shown in FIGS. 4 and 5, the upper and lower side edges 42 of the plate 34 are flat.

Figure 6:
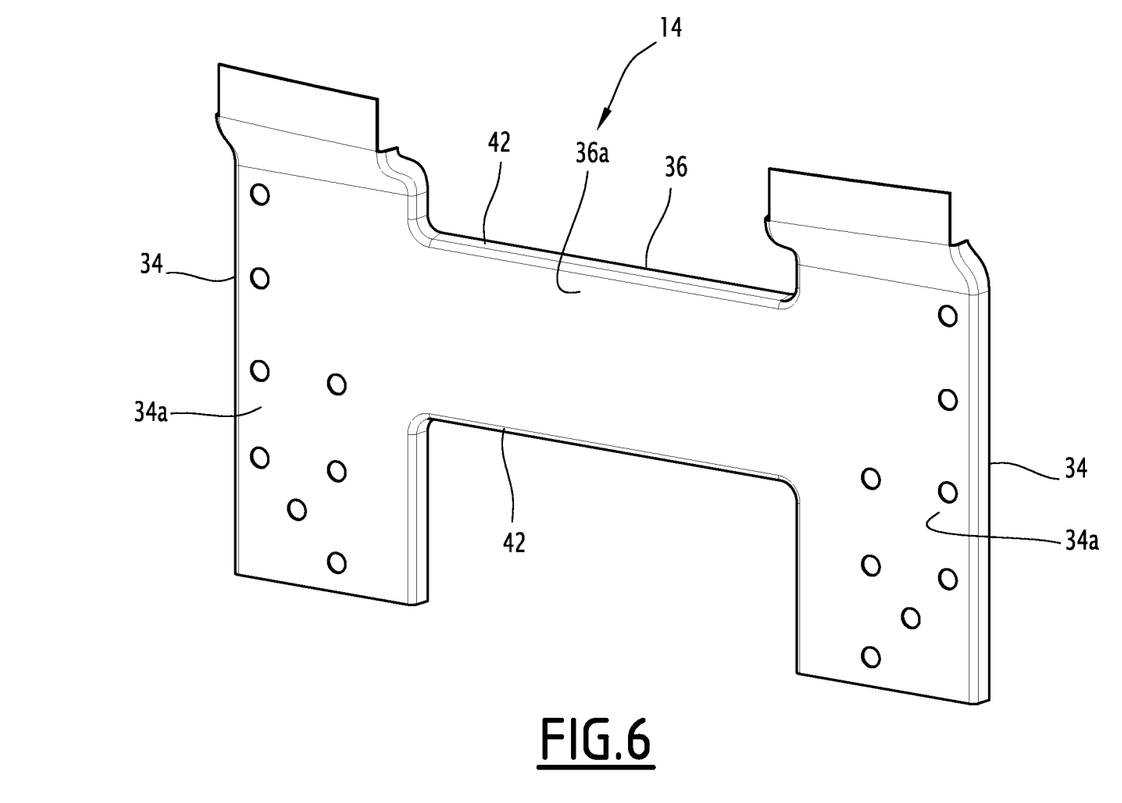

In the embodiment of FIG. 6, the plate 34 is planar but provided with raised or "dropped" side edges 42 to limit the risk of the appearance of cracks on the edges 42 of the plate 36. Nevertheless, the raised side edges have a small height such that the plate 36 keeps a low bending moment in the direction perpendicular to its frontal face 36a. To limit the bending moment of the plate 36, the side edges 42 are advantageously folded down.

Preferably, the dropped and/or folded down side edges 42 extend in sight in a straight section over a length between 5 mm and 10 mm.

Generally, the plate is provided at any point of its length with a straight section granting it a low bending rigidity in the longitudinal direction, such that the plate is relatively flexible in the longitudinal direction in the free state, but, due to its connection with the upper beams, it works essentially in traction between the upper beams in case of impact and offers relatively rigid bearing for the beam that works essentially in compression.

The upper side members 6 are preferably the main side members of the motor vehicle.

The lower side members 8 are, in one embodiment, the lower side members of the structure of the motor vehicle provided for example in the form of extensions extending from the lower side members 6 away from the ends thereof.

In one advantageous embodiment, the lower side members 8 are extensions of an auxiliary cradle or chassis fastened under the structure of the motor vehicle. The cradle can support other equipment of the motor vehicle such as suspension arms, a stabilizer bar and/or a steering system. It can at least partially support an engine, in which case it can be called "engine cradle."

The panel 12 can carry additional optical units (not shown), panel fastening elements (not shown) of the skin of the panel, fastening elements (not shown) of a grille, controlled shutters assembled behind the grille to channel the flows of air.

The invention is applicable to the front portions of motor vehicles as well as the rear portions of motor vehicles and, generally, to the end portions of motor vehicles.

The invention claimed is:

1. A bumper assembly for a motor vehicle having a structure comprising a pair of upper side members (6) and a pair of lower side members (8), the bumper assembly being of the type comprising an energy absorbing panel (12) having at least two energy absorbing columns (16) each provided to bear on ends of an upper side member (6) and a lower side member (8) and an energy absorbing beam (18) extending transversely between the columns (16), wherein the bumper assembly comprises a plate, which is a flexible thin metal sheet, (36) lining the beam (18) such that the beam (18) is compressed against a frontal face (36a) of the plate (36) in case of impact.

2. The bumper assembly according to claim 1, comprising two stages (34), each stage (34) lining a column (16) such that the column (16) is compressed against a front face (34a) of the corresponding stage (34) in case of impact.

3. The bumper assembly according to claim 1, wherein the panel comprises an upper beam (18) and a lower beam (20) extending transversely between the columns (16).

4. The bumper assembly according to claim 3, wherein the plate (36) lines the upper beam (18).

5. The bumper assembly according to claim 1, wherein the panel (12) is a single piece.

6. The bumper assembly according to claim 1, wherein the panel (12) is made from plastic.

7. The bumper assembly according to claim 1, further comprising an end portion of a motor vehicle attached thereto,
wherein said end portion comprises a pair of upper side members (6) and a pair of lower side members (8) and wherein said end portion is attached via said upper and lower side members the plate extending transversely between the side members while being connected thereto.

8. The end portion according to claim 7, wherein the upper side members (6) are the main side members of the structure of the motor vehicle.

9. The end portion according to claim 7, wherein the lower side members (8) are auxiliary side members of the structure of the motor vehicle extending over a smaller height than that of the main side members.

10. The end portion according to claim 7, wherein the lower side members (8) are extensions of a cradle fastened under the structure of the motor vehicle.

11. The end portion according to claim 10, wherein the cradle is an engine cradle.

12. The bumper assembly according to claim 1 further comprising a motor vehicle attached thereto,
wherein an end portion of said motor vehicle comprises a pair of upper side members and a pair of lower side members, and wherein said motor vehicle is attached via said upper and lower side members of said end portion, the plate extending transversely between the side members while being connected thereto.

13. The bumper assembly according to claim 2, wherein the stages (34) are made of metal.

14. A bumper assembly for a motor vehicle having a structure comprising a pair of upper side members (6) and a pair of lower side members (8), the bumper assembly being of the type comprising an energy absorbing panel (12) having at least two energy absorbing columns (16) each provided to bear on the ends of an upper side member (6) and a lower side member (8) and an energy absorbing beam (18) extending transversely between the columns (16),
the bumper assembly further comprising two stages (34), each stage (34) lining a column (16) such that the column (16) is compressed against a front face (34a) of the corresponding stage (34) in case of impact,
wherein the bumper assembly comprises a plate (36) formed in a single piece with the stages (34), which is a flexible thin metal sheet, lining the beam (18) such that the beam (18) is compressed against a frontal face (36a) of the plate (36) in case of impact.

15. A bumper assembly for a motor vehicle having a structure comprising a pair of upper side members (6) and a pair of lower side members (8), the bumper assembly being of the type comprising an energy absorbing panel (12) having at least two energy absorbing columns (16) each provided to bear on the ends of an upper side member (6) and a lower side member (8) and an energy absorbing beam (18) extending transversely between the columns (16),
the bumper assembly further comprising two metal stages (34), each stage (34) lining a column (16) such that the column (16) is compressed against a front face (34a) of the corresponding stage (34) in case of impact,
wherein the bumper assembly comprises a plate (36) formed in a single piece with the stages (34), which is a flexible thin metal sheet, lining the beam (18) such that the beam (18) is compressed against a frontal face (36a) of the plate (36) in case of impact.

* * * * *